United States Patent
Li-On et al.

(10) Patent No.: US 9,274,916 B2
(45) Date of Patent: Mar. 1, 2016

(54) UNIT ATTENTION PROCESSING IN PROXY AND OWNER STORAGE SYSTEMS

(71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Assaf Nitzan, Haifa (IL); Eyal Perek, Petach Tikva (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 308 days.

(21) Appl. No.: 13/916,185

(22) Filed: Jun. 12, 2013

(65) Prior Publication Data

US 2014/0372635 A1    Dec. 18, 2014

(51) Int. Cl.
   *G06F 11/30*    (2006.01)
(52) U.S. Cl.
   CPC ................. *G06F 11/3051* (2013.01)
(58) Field of Classification Search
   None
   See application file for complete search history.

(56) References Cited

U.S. PATENT DOCUMENTS

| | | |
|---|---|---|
| 6,209,023 B1 | 3/2001 | Dimitroff et al. |
| 6,356,977 B2 | 3/2002 | Ofek et al. |
| 6,400,730 B1 | 6/2002 | Latif et al. |
| 6,405,294 B1 | 6/2002 | Hayter |
| 6,557,048 B1 | 4/2003 | Keller et al. |
| 6,718,402 B1* | 4/2004 | Arroyo ........................... 710/19 |
| 6,915,354 B1 | 7/2005 | Ozdemir et al. |
| 6,922,761 B2 | 7/2005 | O'Connell et al. |
| 6,934,799 B2 | 8/2005 | Acharya et al. |
| 6,976,103 B1 | 12/2005 | Watanabe et al. |
| 7,103,712 B2 | 9/2006 | Mizuno |
| 7,173,929 B1 | 2/2007 | Testardi |
| 7,321,925 B2 | 1/2008 | Trethewey |
| 7,340,639 B1 | 3/2008 | Lee et al. |
| 7,409,442 B2 | 8/2008 | Basham et al. |
| 7,577,169 B1 | 8/2009 | Dinh et al. |
| 7,594,024 B2 | 9/2009 | Shah et al. |
| 7,610,467 B2 | 10/2009 | Mimatsu et al. |
| 7,634,588 B2 | 12/2009 | Okada et al. |
| 7,640,408 B1 | 12/2009 | Halligan et al. |

(Continued)

OTHER PUBLICATIONS

Bigang et al., "Design and Implementation of a Storage Virtualization System Based on SCSI Target Simulator in SAN," Tsinghua Science and Technology, v. 10, n. 1, p. 122-127.

*Primary Examiner* — Idriss N Alrobaye
*Assistant Examiner* — Dayton Lewis-Taylor
(74) *Attorney, Agent, or Firm* — Griffiths & Seaton PLLC

(57) ABSTRACT

Methods, apparatus and computer program products implement embodiments of the present invention that include a storage device configured to store a logical volume mapped between a host computer and a computer having multiple initiator ports, and a processor configured to detect a unit attention condition for the logical volume. Examples of unit attention conditions for the logical volume include management operations on the logical volume and host requests for the logical volume. Upon detecting a unit attention condition, the processor can to generate a unit attention code and a respective unique serial number in response to detecting the unit attention condition, and upon receiving an input/output (I/O) request for the logical volume from a given initiator port, the processor can convey, to the given initiator port, the unit attention code and the respective unique serial number in response to the I/O request.

18 Claims, 5 Drawing Sheets

(56) References Cited

U.S. PATENT DOCUMENTS

| | | | |
|---|---|---|---|
| 7,668,981 B1 | 2/2010 | Nagineni et al. |
| 7,707,151 B1 | 4/2010 | Blumenau et al. |
| 7,757,055 B2 | 7/2010 | Tsukada et al. |
| 7,778,157 B1 | 8/2010 | Tawri et al. |
| 7,904,681 B1 | 3/2011 | Bappe et al. |
| 7,937,617 B1 | 5/2011 | Nagineni et al. |
| 8,028,110 B1 | 9/2011 | Wigmore |
| 8,060,710 B1 | 11/2011 | Don et al. |
| 8,086,896 B2 | 12/2011 | Allen et al. |
| 8,122,225 B2 | 2/2012 | Recio et al. |
| 8,160,070 B2 | 4/2012 | Dai et al. |
| 8,166,163 B2 | 4/2012 | Ma et al. |
| 8,230,187 B1 | 7/2012 | Krinke, II et al. |
| 8,254,388 B2 | 8/2012 | Kikuchi et al. |
| 8,270,420 B2 | 9/2012 | Wang et al. |
| 8,301,812 B1 | 10/2012 | Riordan et al. |
| 8,359,379 B1 | 1/2013 | Sen |
| 8,370,588 B2 | 2/2013 | Nakajima et al. |
| 8,380,852 B2 | 2/2013 | Allen et al. |
| 8,386,610 B2 | 2/2013 | Yahalom et al. |
| 8,417,895 B1 | 4/2013 | De La Iglesia |
| 8,429,446 B2 | 4/2013 | Hara et al. |
| 8,601,220 B1 | 12/2013 | Corbin et al. |
| 8,713,356 B1 * | 4/2014 | Chan et al. ............... 714/6.1 |
| 8,819,317 B1 | 8/2014 | Li-On et al. |
| 2002/0071386 A1 | 6/2002 | Gronke |
| 2002/0073297 A1 | 6/2002 | Mizuno et al. |
| 2002/0193146 A1 | 12/2002 | Wallace et al. |
| 2002/0194407 A1 | 12/2002 | Kim |
| 2003/0067890 A1 | 4/2003 | Goel et al. |
| 2003/0212785 A1 | 11/2003 | Jibbe |
| 2005/0157730 A1 | 7/2005 | Grant et al. |
| 2005/0210144 A1 | 9/2005 | Kumagai et al. |
| 2006/0291392 A1 | 12/2006 | Alicherry et al. |
| 2008/0270564 A1 | 10/2008 | Rangegowda et al. |
| 2009/0037638 A1 | 2/2009 | Izuta et al. |
| 2009/0213736 A1 | 8/2009 | Liu et al. |
| 2009/0292834 A1 | 11/2009 | Neemidge et al. |
| 2010/0011114 A1 | 1/2010 | Thomas et al. |
| 2010/0070722 A1 | 3/2010 | Otani et al. |
| 2010/0161843 A1 | 6/2010 | Spry |
| 2010/0185794 A1 | 7/2010 | Belyakov et al. |
| 2010/0262772 A1 * | 10/2010 | Mazina ............... 711/114 |
| 2011/0004707 A1 | 1/2011 | Spry et al. |
| 2011/0179414 A1 | 7/2011 | Goggin et al. |
| 2012/0137098 A1 | 5/2012 | Wang et al. |
| 2012/0221790 A1 | 8/2012 | Nunez et al. |
| 2012/0278280 A1 | 11/2012 | Broido et al. |
| 2012/0278572 A1 | 11/2012 | Broido et al. |
| 2013/0007364 A1 | 1/2013 | Xiong et al. |
| 2013/0046949 A1 | 2/2013 | Colgrove et al. |
| 2013/0067163 A1 | 3/2013 | Velayudhan et al. |
| 2013/0339647 A1 | 12/2013 | Jindo et al. |

\* cited by examiner

UNIT ATTENTION PROCESSING IN PROXY AND OWNER STORAGE SYSTEMS

CROSS-REFERENCE TO RELATED APPLICATIONS

This application is related to U.S. Patent Applications titled "Processing Input/Output Requests Using Proxy and Owner Storage Systems", "Impersonating SCSI Ports Via an Intermediate Proxy", "Safely Mapping and Unmapping of Host SCSI Volumes", "Online Migration of a Logical Volume Between Storage Systems" and "Load Balancing Input/Output Requests Between Two Computers" filed on even date with the present application, and which are incorporated herein by reference.

FIELD OF THE INVENTION

The present invention relates generally to storage systems, and specifically to conveying a unit attention code to a host computer via a proxy storage controller.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) and are exposed through a unique identifier such as a logical unit number (LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY

There is provided, in accordance with an embodiment of the present invention an owner storage system, including a storage device configured to store a logical volume mapped between a host computer and a computer having multiple initiator ports, and a processor configured to detect a unit attention condition for the logical volume, to generate a unit attention code and a respective unique serial number in response to detecting the unit attention condition, and upon receiving an input/output (I/O) request for the logical volume from a given initiator port, to convey, to the given initiator port, the unit attention code and the respective unique serial number in response to the I/O request.

There is also provided, in accordance with an embodiment of the present invention a method, including receiving, by a first computer, a input/output (I/O) request for a logical volume stored on an owner module, the I/O request being received from a given one of multiple initiator ports on a second computer, conveying the I/O request to a third computer, receiving, in response to the conveyed I/O request, a unit attention code and a respective unique serial number from the third computer, and upon determining, based on the unique serial number, that the first computer has not yet conveyed the unit attention code to any of the multiple initiator ports, conveying a unit attention message to the given initiator port.

There is further provided, in accordance with an embodiment of the present invention a storage facility, including a storage area network (SAN), and first, second and third computers configured on the SAN, the first computer being coupled to the SAN via multiple ports and configured to receive, via a given one of the multiple ports, an input/output (I/O) request for a logical volume stored on an owner module, the I/O request being received from a given one of multiple initiator ports on the second computer, to convey the I/O request to the third computer, to receive, in response to the conveyed I/O request, a unit attention code and a respective unique serial number from the third computer, and upon determining, based the unique serial number, that the first computer has not yet conveyed the unit attention code to any of the multiple initiator ports, to convey a unit attention message to the given initiator port.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
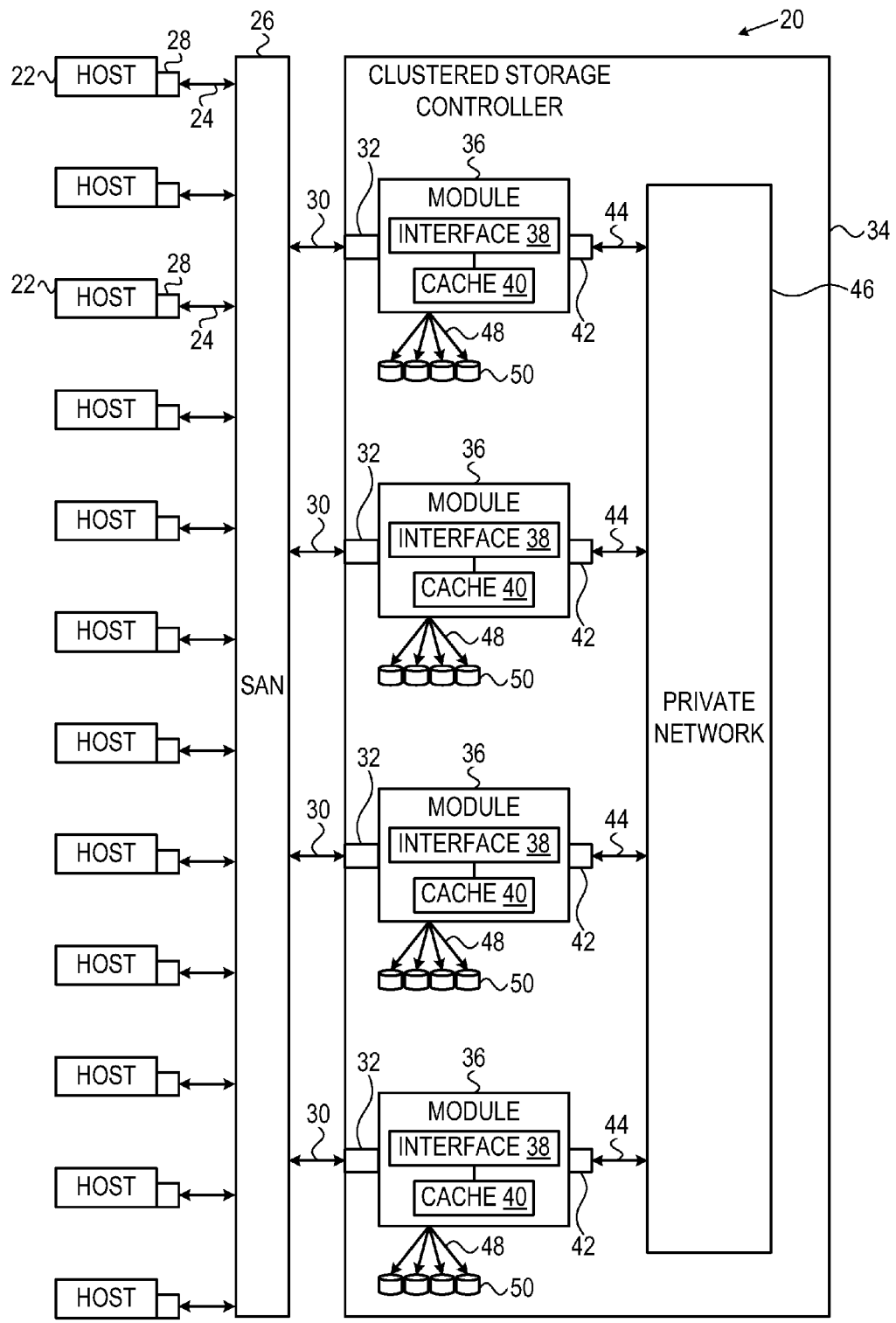
FIG. 1 is a block diagram that schematically illustrates a storage system, in accordance with an embodiment of the present invention.

In a storage facility comprising a host computer and a Small Computer System Interface (SCSI) based storage system, connections are typically single sided, wherein a first SCSI device comprises an initiator (i.e., a device such as a host computer that opens a connection) and a second SCSI device comprises a target (e.g., a storage system). In operation, the initiator initiates input/output requests that are processed by the target.

There may be instances when the target conveys a notification to the initiator about a specific event. For example, the target may detect a status change of a logical volume mapped to the initiator, and the target can convey a unit attention code to the initiator to indicate the logical volume's status change. In the disclosure and in the claims, a unit attention code indicates a change in status of the storage system. When an intermediate proxy storage system is used to convey I/O requests (also referred to herein as proxy I/O requests) between a host computer (i.e., an initiator) and an owner storage system (i.e., a target), there may not be any relation among first communication paths between the host computer and the proxy storage system and second communication paths between the proxy storage system and the owner storage system.

Embodiments of the present invention provide methods and mechanisms to ensure that a host computer receives a single instance of a unit attention code that was generated by an owner storage system in a SCSI based storage facility comprising a proxy storage system and an owner storage system configured to process proxy I/O requests. In some embodiments, the owner storage system can include a unique serial number with each unit attention code conveyed to a proxy storage system. In embodiments described herein, the host computer and the proxy and the owner storage systems are configured on a multipath Small Computer System Interface (SCSI) based storage area network (SAN).

As explained hereinbelow, the proxy storage system can receive, from a given one of multiple host ports on a host computer, a proxy input/output (I/O) request for a logical volume stored on an owner storage system, and then convey the proxy I/O request to the owner storage system. Upon receiving, a given unit attention code and a respective unique serial number from the owner storage system in response to the conveyed proxy I/O request, the proxy storage system can then determine whether or not the host computer has already received the given unit attention code.

If the proxy storage system determines, based the unique serial number, that the host has not yet received the unit attention code, the proxy storage system can convey the unit attention code to the host computer. However, if the proxy storage system determines, based the unique serial number, that the host has already received the unit attention code, the proxy storage system can reconvey (i.e., retransmit) the proxy I/O request to the owner storage system, receive, from the owner storage system a result of the I/O request, and convey the result to the host computer.

Processing proxy I/O requests is described in more detail in U.S. Patent Application "Processing Input/Output Requests Using Proxy and Owner Storage Systems", referenced above. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
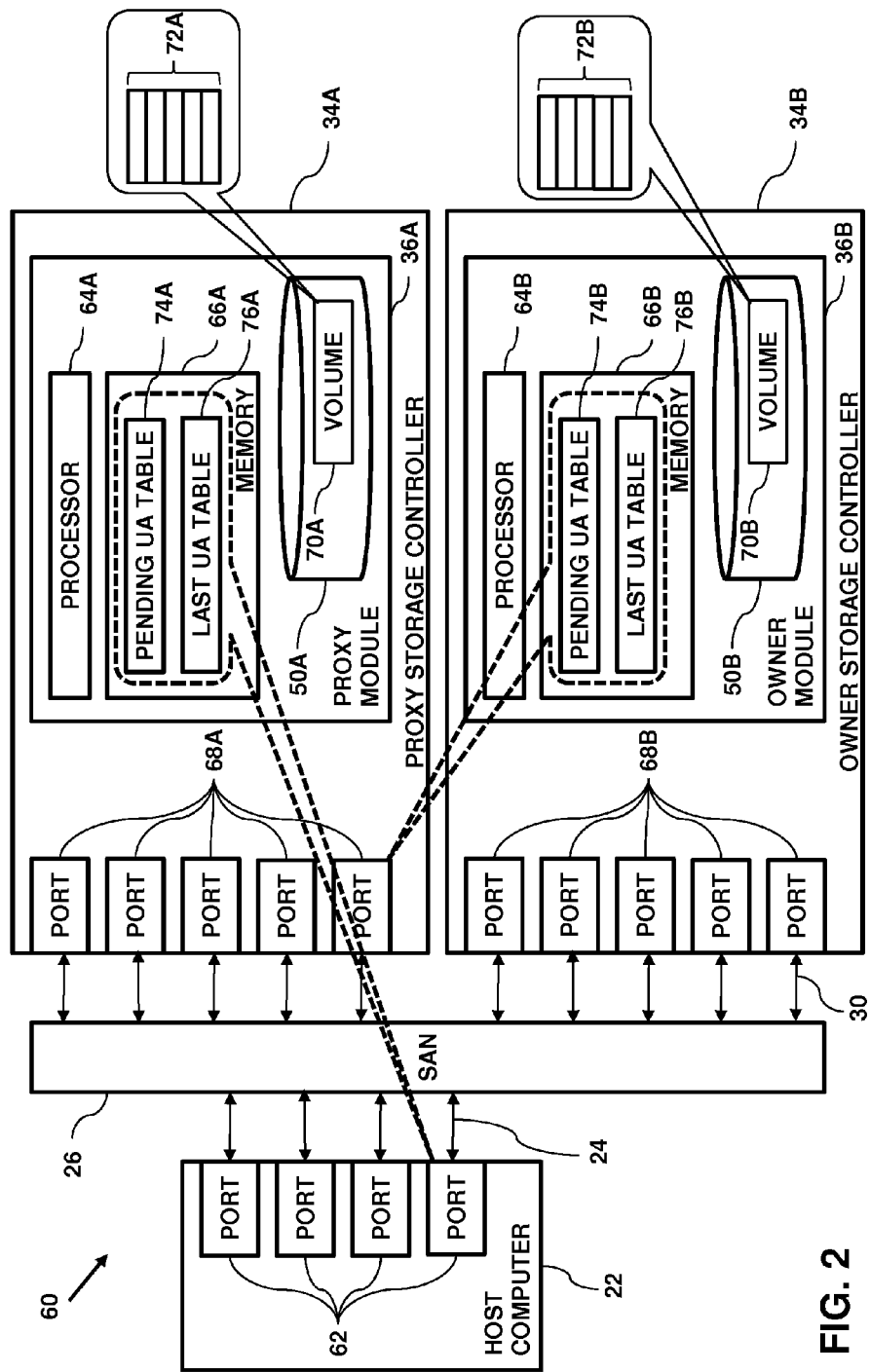
FIG. 2 is a block diagram that schematically illustrates a first example of a storage facility configured to convey a unit attention code to a host computer, in accordance with an embodiment of the present invention.

FIG. 2 is a block diagram that schematically illustrates a first example of a storage facility 60 configured to convey a unit attention code to a host computer, in accordance with an embodiment of the present invention. In the description herein, storage controllers 34 and their respective components may be differentiated by appending a letter to the identifying numeral, so that facility 60 comprises host computer 22 and storage controllers 34A and 34B that are configured to communicate with each other via SAN 26. In embodiments herein, storage controller 34A may also be referred to as proxy storage controller 34A and module 36A may also be referred to as proxy module 36A, and storage controller 34B may also be referred to as owner storage controller 34B and module 36B may also be referred to as owner module 36B.

Host computer 22 communicates with SAN 26 via ports 62 (also referred to herein as host ports 62). Module 36 comprises a processor 64 and a memory 66, and communicates with SAN 26 via ports 68. In some embodiments ports 62 and 68 may comprise SCSI ports, and the SCSI ports may be configured within module 36. In embodiments herein, ports 68A may also be referred to as proxy ports and ports 68B may also be referred to as owner ports.

In the configuration shown in FIG. 2, host computer 22, storage controller 34A and storage controller 34B can communicate with each other over multiple paths, wherein each of the paths can be defined as follows:

Host computer 22 and storage controller 34A can communicate over a given path on SAN 26 between a given port 62 and a given port 68A.

Host computer 22 and storage controller 34B can communicate over a given path on SAN 26 between a given port 62 and a given port 68B.

Storage controller 34A and storage controller 34B can communicate over a given path on SAN 26 between a given port 68A and a given port 68B.

While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, logical volume 70 may be stored across multiple storage devices 50 in a given storage controller 34.

Logical volume 70 comprises data stored in multiple regions 72. Each region (also known as a partition or a block) comprises a sequence of bytes on storage device 50 that have a specific length, typically one megabyte. In embodiments of the present invention, processor 64 may also maintain, in memory 66, a pending unit attention (UA) table 74 for volume 70 and a last UA table 76 for each initiator port in communication with storage controller 34. In the configuration shown in FIG. 2, a given initiator port for storage controller 34A comprises a given host port 62. While for purposes of illustrative simplicity, the configuration in FIG. 2 shows module 36 comprising a single last UA table 76, the module may have a separate last UA table 76 for each of the initiator ports in communication with the module.

Pending UA table 74A stores unit attention codes and respective unique serial numbers for unit attentions that are pending for host computer 22, and a given last UA table 76A stores a respective unique serial number for a most recent UA code that processor 64A conveyed to a given host port 62. Pending UA table 74B stores unit attention codes and respective unique serial numbers for unit attentions that are pending for proxy storage controller 34A, and a given last UA table 76B stores a respective unique serial number for a most recent UA code that processor 64B conveyed to a given proxy port 68A.

Figure 3:
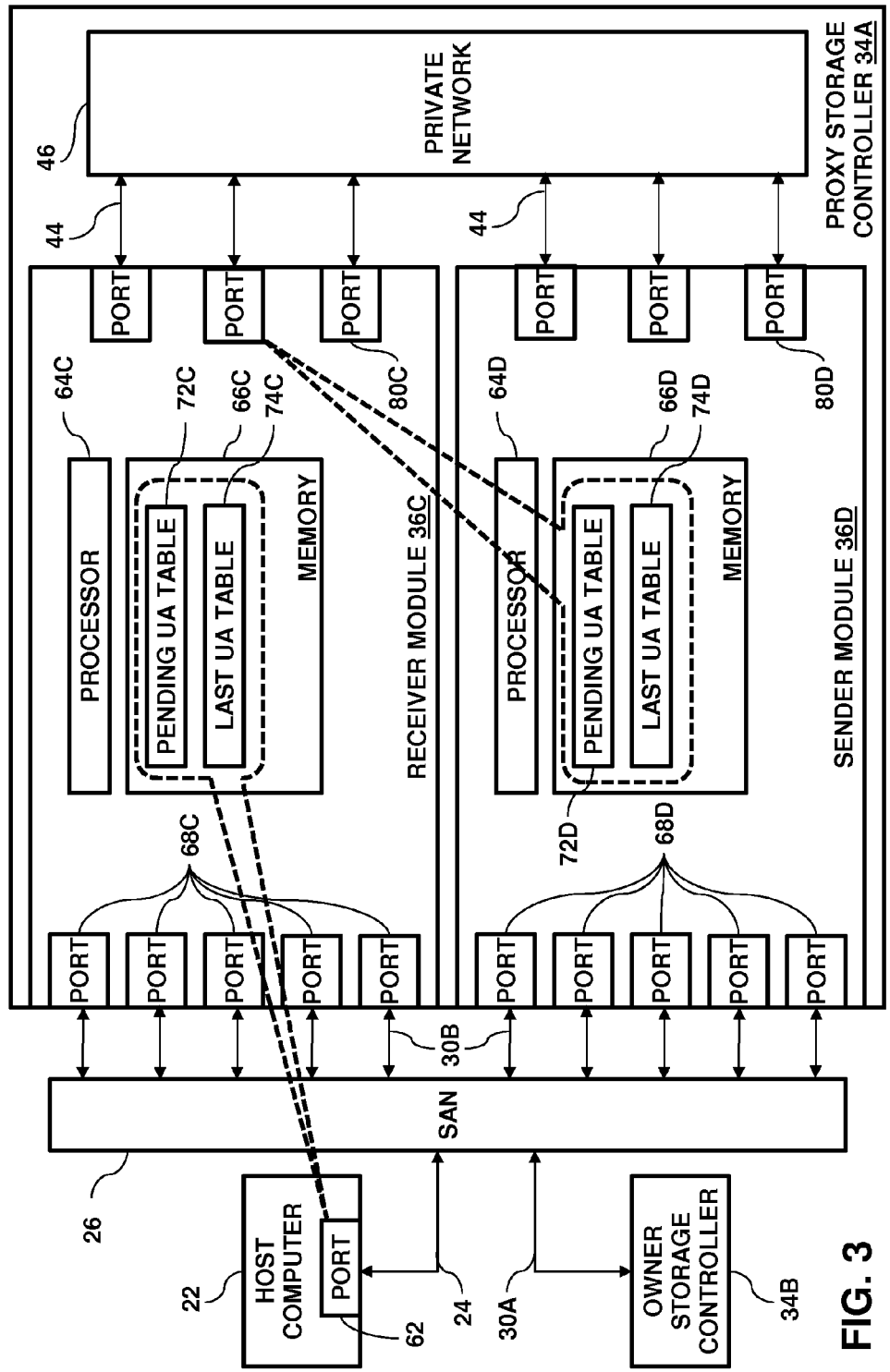
FIG. 3 is a block diagram that schematically illustrates a second example of a storage facility configured to of a first example of a storage facility configured to convey the unit attention code to a host computer, in accordance with an embodiment of the present invention.

FIG. 3 is a block diagram that schematically illustrates a second example of storage facility 60, in accordance with an embodiment of the present invention. In the description herein, proxy module 36A and its respective components may be differentiated by appending a letter to the identifying numeral, so that module 36A comprises a receiver module 36C and a sender module 36D.

In embodiments described herein, processor 64C is configured to receive proxy I/O requests from a given host port 68, to convey the proxy I/O request to processor 64D via a given internal port 80C that couples receiver module 36C to private network 46, to receive a response to the request via the internal network, and to convey the response to the given host port. Additionally, processor 64D is configured to receive, from receiver module 36C, proxy I/O requests via a given internal port 80D that couples sender module 36D to private network 46, to perform the I/O request, and to convey the response to the receive module via the private network.

Pending UA table 74C stores unit attention codes and respective unique serial numbers for unit attentions that are pending for host computer 22, and a given last UA table 76C stores a respective unique serial number for a most recent UA code that processor 64C conveyed to a given host port 62. Pending UA table 74D stores unit attention codes and respective unique serial numbers for unit attentions that are pending for receiver module 36C, and a given last UA table 76D stores a respective unique serial number for a most recent UA code that processor 64D conveyed to a given internal port 80C.

Processor 64 typically comprises a general-purpose central processing unit (CPU), which is programmed in software to carry out the functions described herein. The software may be downloaded module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Unit Attention Generation and Processing

In embodiments described herein, logical volume 70B comprises data stored in regions 72B, and is mapped between host computer 22 and proxy storage controller 34A, as described in U.S. patent application "Online Migration of a Logical Volume Between Storage Systems", referenced above. Additionally, processor 64B is configured to generate a unit attention code in response to detecting a unit attention condition for logical volume 70B.

A unit attention condition may occur in response to a management operation initiated by a system administrator or a request from host computer 22. Examples of unit attention conditions that can occur in response to management operations include, but are not limited to, resizing logical volume 70B, setting logical volume 70B to a read-only status and setting logical volume 70B to a read-write status. Examples of unit attention conditions that can occur in response to a request from host computer 22 include, but are not limited to, a request to release a reservation on logical volume 70B and a request to preempt an existing reservation on logical volume 70B.

Figure 4:
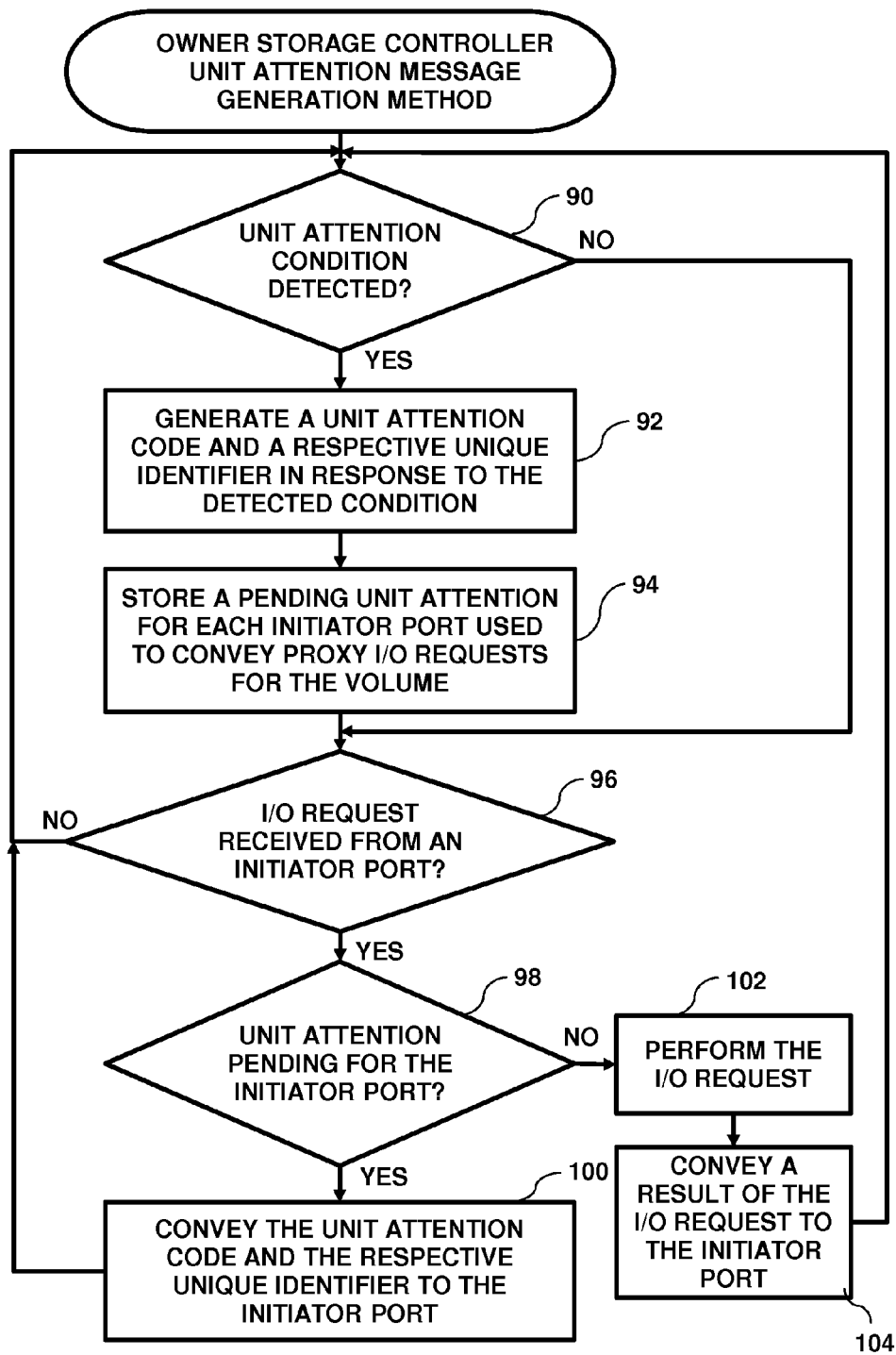
FIG. 4 is a flow diagram that schematically illustrates a method for an owner storage controller to generate unit attention messages, in accordance with an embodiment of the present invention.

FIG. 4 is a flow diagram that schematically illustrates a method for owner storage controller 34B to generate unit attention messages, in accordance with an embodiment of the present invention. In a first comparison step 90, if processor 64B detects a unit attention condition for logical volume 70B, then in a generation step 92, processor 64B generates a unit attention code as is known in the art. In addition to generating the unit attention code, processor 64B generates a respect unique serial number for the generated unit attention. To generate the unique serial number, processor may 64B may implement a software-based counter (not shown) in memory

66B, instruct the counter to perform an increment operation, and retrieve a current value stored in the counter.

In a store step 94, for each given initiator port that is configured to convey I/O requests to volume 70B, processor 64B stores a separate instance of the generated unit attention code and its respective unique serial number to memory 66B. Depending on the configuration of proxy storage controller (as shown in FIGS. 2 and 3), a given initiator port may comprise a given proxy port 68B or a given sender port 68D.

In a second comparison step 96, if processor 64B receives an I/O request from a given initiator port, then in a third comparison step 98, processor 64B checks memory 66 to see if there is a pending unit attention for the given initiator port. In embodiments herein an I/O request may comprise a request to read data from logical volume 70B or a request to write data to logical volume 70B.

If there is a pending unit attention, then the I/O request comprises a first I/O request received from the initiator port subsequent to processor 64B generating the unit attention code and the respective unique serial number. In a first convey step 100, in response to the I/O request, processor 64 conveys the unit attention code and the corresponding unique serial number to the initiator port and removes the pending unit attention for the given initiator port from memory 66B, and the method returns to step 90. If volume 70B is also mapped directly to a given host port 62 and there is a pending unit attention for the given host port, then upon processor 64B receiving an I/O request from the given host port, processor 64B conveys the unit attention code (i.e., without the respective unique serial number) to the given host port.

Returning to step 98, if there is no pending unit attention for the given initiator port (e.g., the I/O request for the logical volume may comprises a second I/O request for the logical volume from the given initiator port subsequent to processor 64B detecting the unit attention condition), then processor 64B performs the I/O request in a perform step 102, conveys a result of the I/O request to the given initiator port in a second convey step 104, and the method returns to step 90. Returning to step 90, if processor 64B does not detect a unit attention condition for volume 70B then the method continues with step 96.

Figure 5:
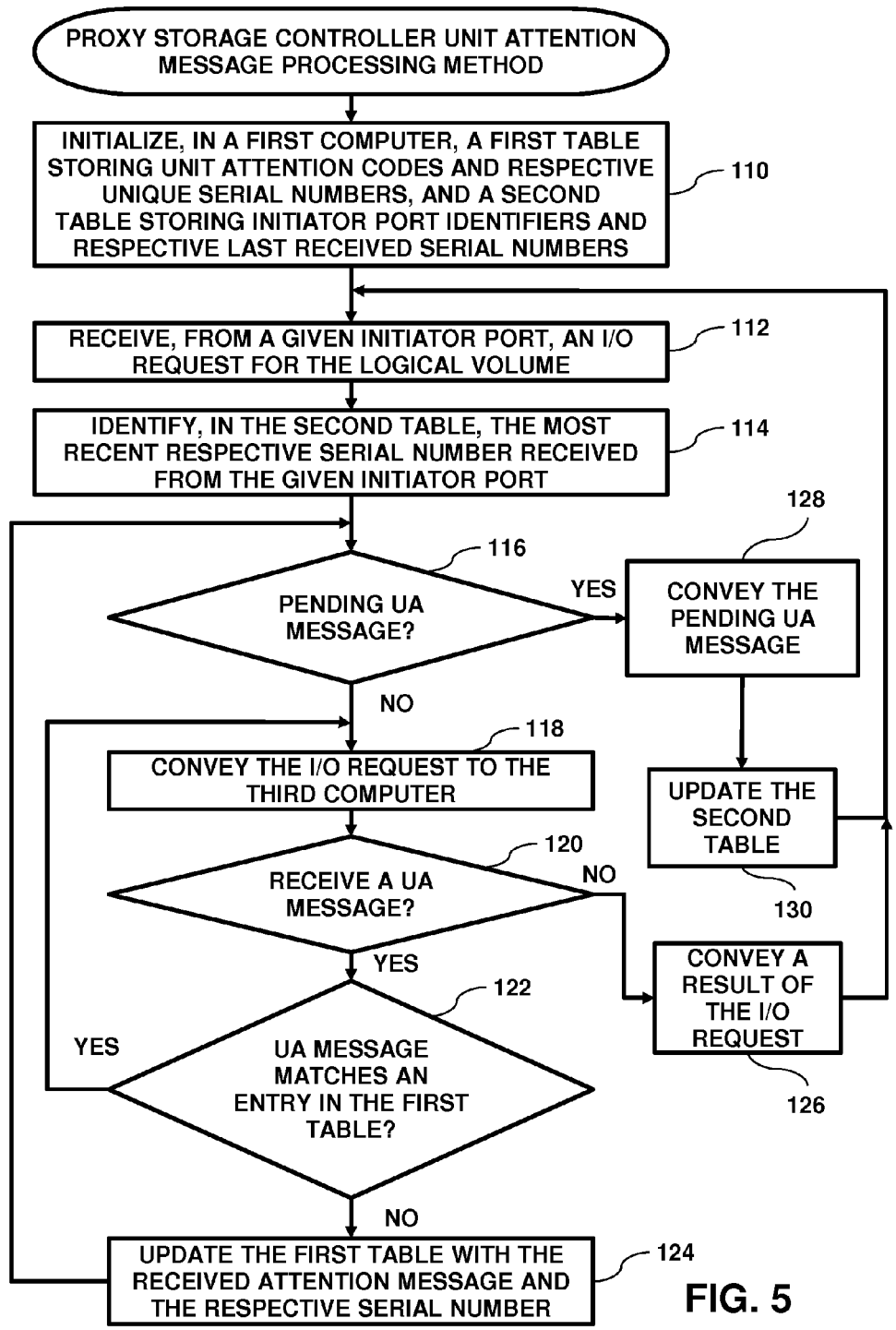
FIG. 5 is a flow diagram that schematically illustrates a method for a proxy storage controller to process the unit attention messages, in accordance with an embodiment of the present invention.

FIG. 5 is a flow diagram that schematically illustrates a method for a proxy storage controller to process the unit attention messages, in accordance with an embodiment of the present invention. In embodiments described in FIG. 5, a first computer receives an I/O request from a second computer, conveys the I/O request to a third computer, receives a unit attention code and a respective unique serial number from the third computer in response to the I/O request and conveys a unit attention message to the second computer.

In a first embodiment, the first computer comprises proxy module 36A, the second computer comprises host computer 22 and the third computer comprises owner module 36B. In the first embodiment, the unit attention message comprises the unit attention code, and the initiator ports comprise host ports 62.

In a second embodiment, the first computer comprises receiver module 36C, the second computer comprises host computer 22 and the third computer comprises sender module 36D. In the second embodiment, the unit attention message comprises the unit attention code, and the initiator ports comprise host ports 62.

In a third embodiment, the first computer comprises sender module 36D, the second computer comprises receiver module 36C and the third computer comprises owner module 36B. In the third embodiment, the unit attention message comprises the unit attention code and the respective unique serial number, and the initiator ports comprise internal ports 80C.

In the flow diagram shown in FIG. 5, the first computer is performing all the operations described herein. Therefore, depending on the configuration (i.e., the first, second and third embodiments described supra), the operation described in FIG. 5 may be performed by processor 64A, processor 64B or processor 64C. For purposes of descriptive simplicity, the steps in FIG. 5 are described as being performed by a proxy processor 64.

In an initialization step 110, proxy processor 64 initializes pending table 74 to store pending UA codes and respective unique serial numbers for logical volume 70B, and a last UA table 76 for each initiator port in communication with the first computer. In a first receive step 112, proxy processor 64 receives an I/O request for logical volume 70B from a given initiator port, and in an identification step 114, the proxy processor identifies the most recent respective unique serial number received from the given initiator port.

In a first comparison step 116, the proxy processor determines if there is a pending unit attention communication for the given initiator port. To determine if there is a pending unit attention communication for the given proxy port, proxy processor 64 identifies, in last UA table 76, a respective unique serial number for the most recent unit attention code conveyed to the given initiator port, and checks pending UA table 74 to see if there are any unit attention codes for logical volume 70B whose respective unique serial number is greater than the respective unique serial number for the most recent unit attention code conveyed to the given initiator port.

If there are no pending unit attention messages for the given proxy port, then in a first convey step 118, proxy processor conveys the I/O request to the third computer. In a second comparison step 120, if proxy processor receives a unit attention message from the third computer in response to the conveyed I/O request, then the proxy processor, in a fourth comparison step 122, checks if the unique serial number received in the unit attention message matches an entry in pending UA table 74.

If the unique serial number received in the unit attention message does not match any entries in pending UA table 74, then proxy processor 64B, in a first update step 124, updates pending UA table 74 with the unit attention code and the respective serial number received in the unit attention message, and the method returns to step 116. If the unique serial number received in the unit attention message matches an entry, then the method returns to step 118.

Returning to step 120, if proxy processor 64 did not receive a unit attention message from the third computer in response to the conveyed I/O request, then the proxy processor receives a result of the I/O request from the third computer, conveys the result to the second computer in a second convey step 126, and the method returns to step 112.

Finally, returning to step 116, if there are no pending unit attention messages for the given initiator port, then proxy processor 64 conveys the pending unit attention message (i.e., either the unit attention code and the corresponding unique serial number, or just the unit attention code, as described supra) to the given initiator port in a third convey step 128, updates last UA table 76 with the respective unique serial number received in the unit attention message in a second update step 130, and the method returns to step 112.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An owner storage system, comprising:
   a storage device configured to store a logical volume mapped between a host computer and a computer having multiple initiator ports; and
   a processor configured:
   to detect a unit attention condition for the logical volume,
   to generate a unit attention code and a respective unique serial number in response to detecting the unit attention condition,
   upon receiving an input/output (I/O) request for the logical volume from a given initiator port, to convey, to the given initiator port, the unit attention code and the respective unique serial number in response to the I/O request, and
   upon determining, based on the unique serial number, that the processor has previously conveyed the unit attention code to any of the multiple initiator ports, to reconvey the I/O request, receive a response for the I/O request, and convey the result to the host computer.

2. The owner storage system according to claim 1, wherein the unit attention condition is selected from a list comprising a management operation on the logical volume and a host request for the logical volume.

3. The owner storage system according to claim 2 wherein the management operation is selected from a list comprising resizing the logical volume, setting the logical volume to a read-only status and setting the logical volume to a read-write status.

4. The owner storage system according to claim 2, wherein the host request is selected from a list comprising a request to release a reservation on the logical volume and a request to preempt a reservation on the logical volume.

5. The owner storage system according to claim 1, wherein the I/O request is selected from a list comprising a request to read data from the logical volume and a request to write data to the logical volume.

6. The owner storage system according to claim 1, wherein the computer comprises a proxy storage system, and wherein the logical volume comprises regions on the owner storage system that have a mapping between a host computer and the proxy storage system.

7. The owner storage system according to claim 1, wherein the I/O request for the logical volume comprises a first I/O request for the logical volume, and comprising receiving a second I/O request for the logical volume from the given initiator port, performing the second I/O request, and conveying a result of the I/O request to the given initiator port.

8. A method comprising,
   receiving, by a first computer, a input/output (I/O) request for a logical volume stored on an owner module, the I/O request being received from a given one of multiple initiator ports on a second computer;
   conveying the I/O request to a third computer;
   receiving, in response to the conveyed I/O request, a unit attention code and a respective unique serial number from the third computer;
   upon determining, based on the unique serial number, that the first computer has not yet conveyed the unit attention code to any of the multiple initiator ports, conveying a unit attention message to the given initiator port; and
   upon determining, based on the unique serial number, that the first computer has previously conveyed the unit attention code to any of the multiple initiator ports, reconveying the I/O request to the third computer, receiving a response for the I/O request from the third computer, and conveying the result to the second computer.

9. The method according to claim 8, wherein the first computer comprises a proxy module, and wherein the second computer comprises a host computer, and wherein the third computer comprises the owner module, and wherein the unit attention message comprises the unit attention code.

10. The method according to claim 8, wherein the first computer comprises a receiver module, and wherein the second computer comprises a host computer, and wherein the third computer comprises a sender module, and wherein the unit attention message comprises the unit attention code.

11. The method according to claim 8, wherein the first computer comprises a sender module, and wherein the second computer comprises a receiver module, and wherein the third computer comprises the owner module, and wherein the unit attention message comprises the unit attention code and the respective unique serial number.

12. The method according to claim 8, wherein the unit attention code indicates a management operation selected from a list comprising resizing the logical volume, setting the logical volume to read-only and setting the logical volume to read-write.

13. The method according to claim 8, wherein the unit attention code indicates a host request selected from a list comprising a request to release a reservation on the logical volume and a request to pre-empt a reservation on the logical volume.

14. A storage facility, comprising:
   a storage area network (SAN); and
   first, second and third computers configured on the SAN, the first computer being coupled to the SAN via multiple ports and configured:
   to receive, via a given one of the multiple ports, an input/output (I/O) request for a logical volume stored on an owner module, the I/O request being received from a given one of multiple initiator ports on the second computer,
   to convey the I/O request to the third computer,
   to receive, in response to the conveyed I/O request, a unit attention code and a respective unique serial number from the third computer, upon determining, based the unique serial number, that the first computer has not yet conveyed the unit attention code to any of the multiple initiator ports, to convey a unit attention message to the given initiator port, and upon determining, based on the unique serial number, that the first computer has previously conveyed the unit attention code to any of the multiple initiator ports, to reconvey the I/O request to the third computer, to receive a response for the I/O request from the third computer, and to convey the result to the second computer.

15. The storage facility according to claim 14, wherein the first computer comprises a proxy module, and wherein the second computer comprises a host computer, and wherein the third computer comprises the owner module, and wherein the unit attention message comprises the unit attention code.

16. The storage facility according to claim 14, wherein the first computer comprises a receiver module, and wherein the second computer comprises a host computer, and wherein the third computer comprises a sender module, and wherein the unit attention message comprises the unit attention code.

17. The storage facility according to claim 14, wherein the first computer comprises a sender module, and wherein the second computer comprises a receiver module, and wherein the third computer comprises the owner module, and wherein the unit attention message comprises the unit attention code and the respective unique serial number.

18. The storage facility according to claim 14, wherein the unit attention code indicates a management operation selected from a list comprising resizing the logical volume, setting the logical volume to read-only and setting the logical volume to read-write.

* * * * *